(12) United States Patent
Imai (10) Patent No.: US 7,964,841 B2
(45) Date of Patent: Jun. 21, 2011

(54) IMAGE DISPLAY DEVICE HAVING A LASER BEAM DIAMETER CONVERTING OPTICAL SYSTEM

(75) Inventor: Hiroshi Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 285 days.

(21) Appl. No.: 12/513,209

(22) PCT Filed: Oct. 30, 2007

(86) PCT No.: PCT/JP2007/071070
§ 371 (c)(1),
(2), (4) Date: May 1, 2009

(87) PCT Pub. No.: WO2008/053862
PCT Pub. Date: May 8, 2008

(65) Prior Publication Data
US 2010/0014058 A1   Jan. 21, 2010

(30) Foreign Application Priority Data

Nov. 1, 2006  (JP) .................................. 2006-297605

(51) Int. Cl.
*H01J 3/14* (2006.01)
(52) U.S. Cl. ..................................... 250/234; 250/208.1
(58) Field of Classification Search ............... 250/208.1, 250/216, 234, 235; 353/98, 99, 97; 359/205–207; 372/24

See application file for complete search history.

(56) References Cited

U.S. PATENT DOCUMENTS
7,369,584 B2 *   5/2008   Goldman et al. ............... 372/24

FOREIGN PATENT DOCUMENTS

| CN | 1573412 | 2/2005 |
|---|---|---|
| JP | 56-074219 | 6/1981 |
| JP | 11-305710 | 11/1999 |
| JP | 2003-021800 | 1/2003 |
| JP | 2003-043398 | 2/2003 |
| JP | 2005-018040 | 1/2005 |
| JP | 2005-526288 | 9/2005 |
| JP | 2007-121538 | 5/2007 |

OTHER PUBLICATIONS

Chinese Patent Office issued a Chinese Office Action dated Mar. 29, 2010, Application No. 200780040218.8.
David W. Wine et al., "Performance of a Biaxial MEMS-Based Scanner for Microdisplay Applications", Proc. of SPIE vol. 4178, MOEMS and Minaturized Systems, ed. M. Motamedi, R. Goering (Sep. 2000), pp. 186-196.

* cited by examiner

*Primary Examiner* — Que T Le
(74) *Attorney, Agent, or Firm* — Young & Thompson (57) ABSTRACT

The present image display device is an image display device that scans laser beams emitted from light sources 101, 102 and 103 to form an image on a projection surface, and includes laser beam diameter-converting optical systems 104 that shape a beam waist of a laser beam, and horizontal scanner 106 and vertical scanner 107 for scanning a laser beam. Beam diameter-converting optical systems 104 adjust the beam diameter at the position of mirror 26, which is a beam deflector for scanner 106 and 107, to be smaller than the mirror diameter. Also, beam diameter-converting optical systems 104 shape beam waist 110 so that a full width at half maximum of the intensity, which corresponds to beam diameter 114 or 116, is always smaller than pixel pitch 115 or 117 in projection range 118 defined between first projection surface 112 and second projection surface 113.

10 Claims, 8 Drawing Sheets

IMAGE DISPLAY DEVICE HAVING A LASER BEAM DIAMETER CONVERTING OPTICAL SYSTEM

TECHNICAL FIELD

The present invention relates to an image display device that scans laser beams emitted from light sources to form an image.

BACKGROUND ART

In recent years, research and development of projection-type imaging devices that project an enlarged image on a screen via a projection lens, using, e.g., a halogen lamp or high-pressure mercury lamp that emits incoherent light as, e.g., a liquid-crystal light valve, have actively been conducted. However, projection-type imaging devices and image projection devices related to the present invention have a problem in consuming a large amount of power and having only a weak brightness because they use spontaneously-emitted incoherent light. Also, the incoherent light sources have a problem in that it is difficult to provide a display having a broad chromaticity range because of the broad wavelength bands of the respective light sources for red, green and blue. Research and development of image display devices using laser light that produces coherent light for light sources have been conducted as a method for providing a display that has low power consumption, strong brightness and a broad chromaticity range.

Figure 1A:
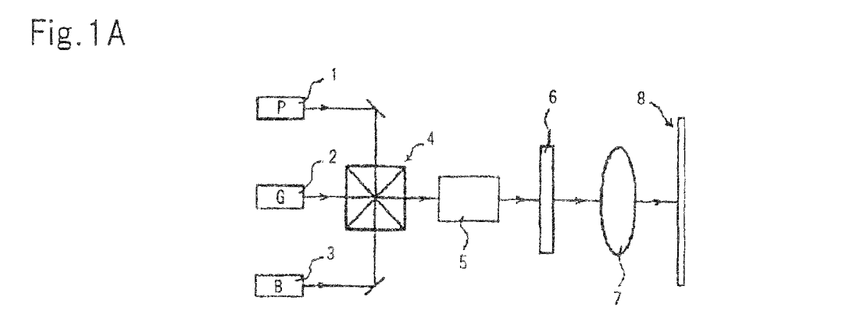
FIG. 1A is a diagram for describing an example of an image projection device related to the present invention, the image projection device using coherent light sources.

Japanese Patent Laid-Open No. 11-305710 discloses an image projection device that uses laser light as coherent light sources. FIG. 1A is a diagram for describing an image projection device related to the present invention, the image projection device using coherent light sources. In the image projection device disclosed in Japanese Patent Laid-Open No. 11-305710, as illustrated in FIG. 1A, laser light beams emitted from red (R) pulse laser 1, green (G) pulse laser 2 and blue (B) pulse laser 3 are combined by dichroic prism 4. The combined light is subjected to in-plane light amount uniformization by means of integrator 5, and then illuminates a light modulation element (light valve) 6. Then, an image in the light modulation element (light valve) is projected on screen 8 by means of projection lens 7, thereby a color image is displayed.

However, in the case of an imaging system using a projection lens in an image projection device using laser light for coherent light sources, the imaging system comes into focus only within a focal depth of the projection lens. Thus, it is necessary for a user to perform focusing according to the screen position. This causes a problem in reducing the convenience of using a portable projection-type image display device.

Figures 1B, 2A:
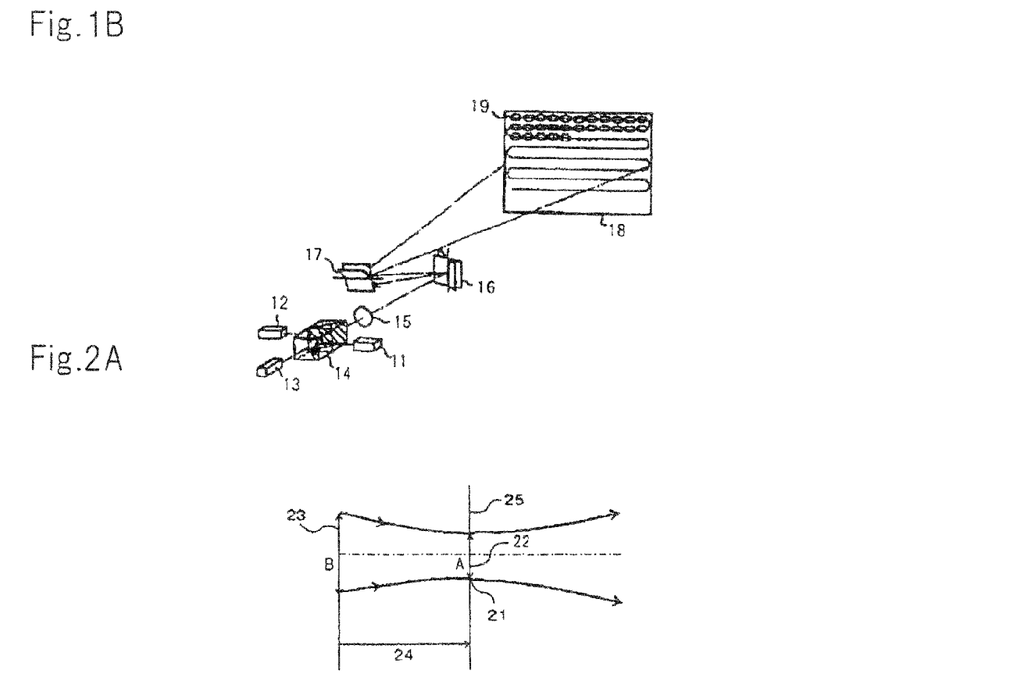
FIG. 1B is a diagram for describing another example of an image projection device related to the present invention, the image projection device using coherent light sources.
FIG. 2A is a diagram for describing an image display device related to the present invention, the image display device using laser light having beam diameter B, which is larger than beam diameter A in its beam waist.

Projection-type display devices that scans laser beams, which travel in a straight line, to project and display an image are disclosed (for example, in Japanese Patent Laid-Open No. 2003-21800) as a method for eliminating the need for a user to perform focusing in a certain projection range. FIG. 1B is a diagram for describing an example of a projection-type display device related to the present invention, the projection-type display device scanning a laser beam to project and display an image. In the projection-type display device disclosed in Japanese Patent Laid-Open No. 2003-21800, as illustrated in FIG. 1B, laser beams emitted from red, green and blue light sources 11, 12 and 13, respectively, are combined by color-combining element 14 the combined light is then collimated by collimator lens 15 so that the beam waist of the laser beam comes to the vicinity of projection surface 18 as a pixel 19, and then, is two-dimensionally scanned via optical scanning elements 16 and 17, which perform horizontal and vertical optical scanning, thereby a color image is displayed.

DISCLOSURE OF THE INVENTION

In order for a projection-type display device, which scans a laser beam to project and display an image, to locate the beam waist at a position of the projection surface, as illustrated in FIG. 2A, it is necessary that a laser beam having a diameter (beam diameter B23) larger than beam diameter A22 at beam waist 21 be propagated by projection distance 24 and narrowed down and collimated on projection surface 25.

Figure 2B:
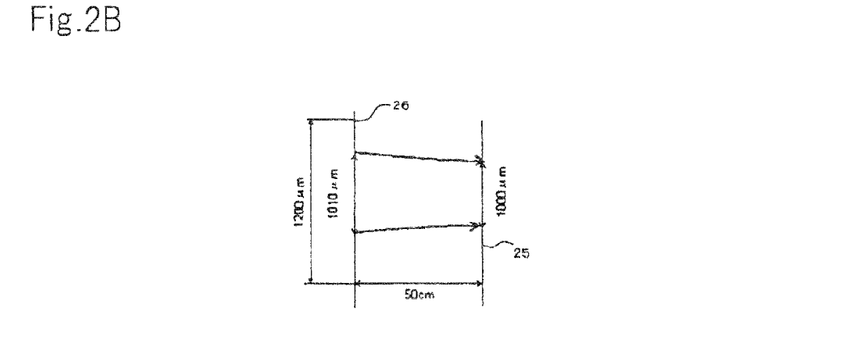
FIG. 2B is a diagram illustrating a beam diameter at the position of an optical scanning element for narrowing a laser beam down to a predetermined value in the full width at half maximum of its intensity and collimating it when an image is displayed with a predetermined projection distance, screen size and pixel count.

As illustrated in FIG. 2B, in order to narrow a laser beam down to 1000 µm in the full width at half the maximum of its intensity and collimate it to display an image with 800 horizontal pixels and 600 vertical pixels on a screen with a size of 800 horizontal pixels and 600 vertical pixels at a projection distance of 50 cm, the beam diameter at the position of an optical scanning element should be 1010 µm as a result of calculation according to the Fresnel diffraction integral (in the case of a fundamental Gaussian beam with a wavelength of 650 nm).

Here, it is assumed that a micromechanical mirror is used for the scanning element. In this case, for example, a resonance-type micromechanical mirror formed of a single-crystal silicon substrate has a responsiveness of approximately 18 KHz when the mirror size is 1200 µm and is available to display images having with 800 horizontal pixels and 600 vertical pixels and a screen update frequency of 60 Hz under this condition at a maximum (See Non-Patent Document 1, "Performance of A Biaxial MEMS-Based Scanner for Microdisplay Applications, Proceedings of SPIE 4178," pp. 186-196).

Figure 2C:
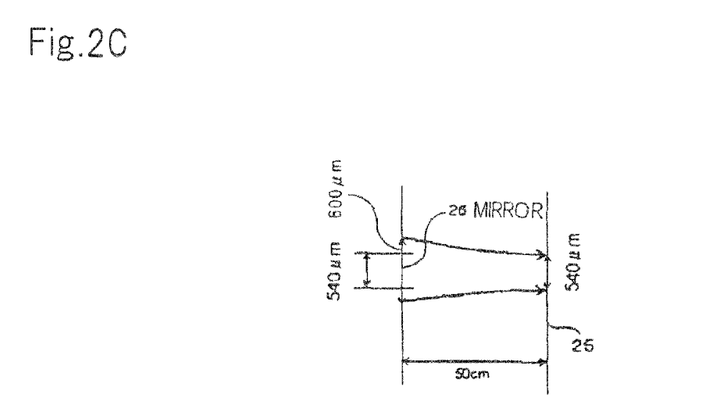
FIG. 2C is a diagram illustrating a beam diameter at the position of an optical scanning element for providing a vertical definition that is 1.7 times that of the case illustrated in FIG. 2B.

However, for higher definition, as illustrated in FIG. 2C, in order to provide a vertical definition (1280 horizontal pixels and 1024 vertical pixels) 1.7 times that of the case illustrated in FIG. 2B, for example, it is necessary that a laser beam be narrowed down to 540 µm in the full width at half maximum of its intensity and collimated, through a propagation distance of 50 cm. In this case, the beam diameter at the position of the optical scanning element is 600 µm as a result of calculation according to the Fresnel diffraction integral. An increase in the scanning speed of the mirror is required for high-definition image display, and in order to achieve it, the mirror should be downsized.

Here, taking into account general mechanical considerations, the inertia moment of a mirror is inversely proportional to the cube of the dimension of the mirror in its oscillation direction, and the resonance frequency is proportional to one-half the power of the inertia moment. Accordingly, the resonance frequency is inversely proportional to the three-second power of the dimension of the mirror in its oscillation direction.

Accordingly, for example, if the definition is increased by a factor of 1.7, it is necessary that the scanning frequency be also increased by a factor of 1.7. Then, it is necessary to at least make the dimension of the mirror in its oscillation direction be no more than 0.45 times, which is the three-second power of the inverse of 1.7. In other words, it is necessary to make the dimension of the mirror in its oscillation direction be no more than 540 µm.

However, in this case, there is a problem in that a high-definition image display cannot be provided while securing a margin of mirror 26 (which is approximately 1.2 times) equal to that of the case illustrated in FIG. 2B. In other words, in the case of FIG. 2B (800 horizontal pixels and 600 vertical pixels), the beam diameter at the position of the optical scanning element is 1010 µm while the mirror size is 1200 µm, and thus, the margin of the mirror, which is approximately 1.2 times the beam diameter, can be ensured. Meanwhile, in the case of the vertical definition (1280 horizontal pixels and 1024 vertical pixels) that is 1.7 times that of the aforementioned case, the beam diameter is 600 µm while the mirror size is no more than 540 µm, i.e., the mirror size is smaller than the beam diameter, making it impossible to form a desired image.

Figure 3:
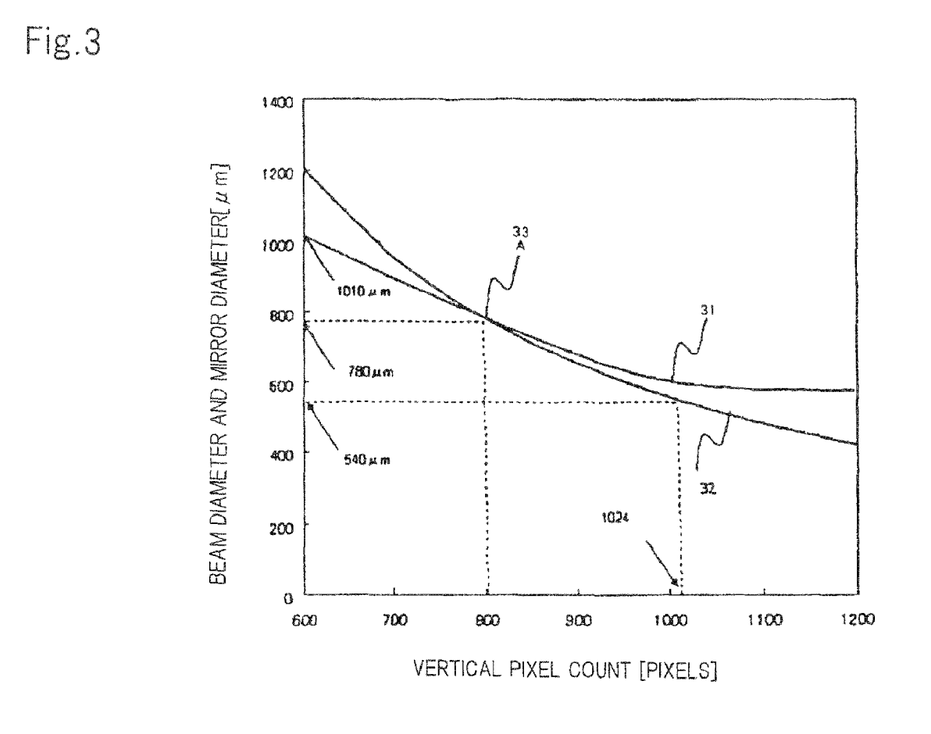
FIG. 3 is a graph illustrating the relationship between a vertical pixel count, and a beam diameter on a mirror surface and a mirror diameter.

FIG. 3 is a graph illustrating the relationship between a vertical pixel count, and a beam diameter on a mirror surface and a mirror diameter. The relationship in size between beam diameter 31 on a mirror surface and mirror diameter 32 in FIG. 3 is reversed via point A33. In the case of this example, 800 pixels are the limit of the vertical resolution in which the beam diameter is smaller than the mirror diameter.

Therefore, in view of the aforementioned problems, an object of the present invention is to provide an image display device that displays a high-definition image using a small scanning element.

In order to achieve the above object, an image display device according to the present invention comprises: scanner that scans a laser beam emitted from a light source to form an image on a projection surface; and a laser beam diameter-converting system that determines the position of a beam waist and the diameter of the beam waist so that a beam diameter of the laser beam at the position of the beam deflector of the scanner is larger than the dimension of the beam deflector, and so that the intensity distribution of the laser beam according to a Fresnel diffraction integral is smaller than a pixel pitch.

As described above, the laser beam diameter-converting optical system according to the present invention makes the beam diameter of a laser beam at the position of a beam deflector in the scanner be smaller than the dimension of the beam deflector, enabling a margin relative to the beam diameter of the beam deflector to be ensured. In addition to this, the laser beam diameter-converting optical system according to the present invention determines the position of the beam waist and the beam waist diameter so that the intensity distribution according to the Fresnel diffraction integral is always smaller than the pixel pitch, and thus, overlap of pixels on a projection surface can be prevented.

Also, the beam deflector in the image display device according to the present invention may be a resonance-type micromechanical mirror.

Also, the position of the beam waist in the image display device according to the present invention may be located within a projection distance at which the projection surface exists or may also be the same as the position of the beam deflector.

Also, the scanner in the image display device according to the present invention may include either a convex mirror or a concave mirror, and may provide an afocal system.

Also, the beam diameter of the laser beam in the present invention may be a full width at one half the maximum of its intensity. Also, the laser beam may be a fundamental Gaussian beam.

The pixel pitch in the present invention may be a value obtained by dividing the horizontal size of a screen on the projection surface by the horizontal pixel count or may also be a value obtained by dividing the vertical size of a screen on the projection surface by the vertical pixel count.

Also, the image display device according to the present invention may be one in which the light source modulates the laser intensity according to the shape of the projection surface.

The present invention enables clear image display with no overlap of pixels while securing a margin relative to the beam diameter of the beam deflector in the scanner even when the beam deflector is downsized for speed-up.

BEST MODE FOR CARRYING OUT THE INVENTION

First Exemplary Embodiment

Figure 4:
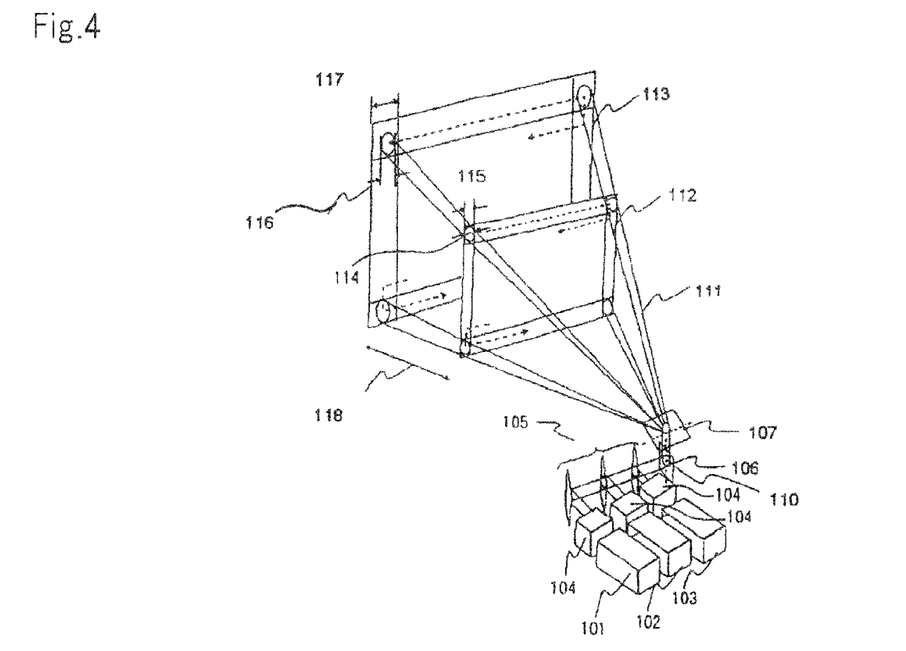
FIG. 4 is an overhead view of a first exemplary embodiment of an image display device according to the present invention.

FIG. 4 is an overhead view of an image display device according to the present exemplary embodiment.

The image display device according to the present exemplary embodiment includes red laser source 101, green laser source 102, blue laser source 103, beam-converting optical systems 104, color-combining optical system 105, horizontal scanner 106 and vertical scanner 107. Each of red laser source 101, green laser source 102 and blue laser source 103 outputs a fundamental Gaussian beam (in TEM00 mode). Laser beams emitted from the respective red, blue and green laser sources pass though beam diameter-converting optical systems 104 and are combined by color-combining optical system 105, and then are scanned by horizontal scanner 106 and vertical scanner 107.

Figure 9A:
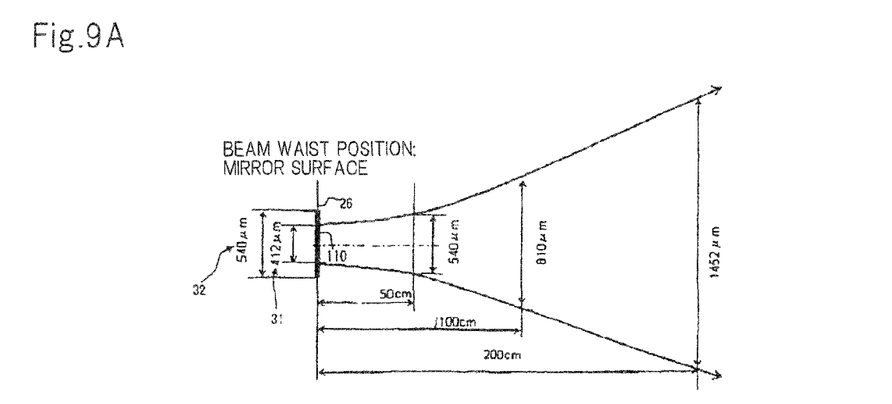
FIG. 9A is a diagram illustrating a beam diameter at a beam waist in a beam diameter-converting optical system according to a first exemplary embodiment.

Beam diameter-converting optical system 104 adjust beam diameter 31 so that beam diameter 31 on mirror 26, which is a beam deflector for horizontal scanner 106 and vertical scanner 107, is smaller than mirror diameter 32 (see FIG. 9A). Also, beam diameter-converting optical systems 104 shape beam waist 110 so that the full width at half maximum of the intensity, which corresponds to beam diameter 114 or 116, is always smaller than pixel pitch 115 or 117 in projection range 118 between first projection surface 112 and second projection surface 113. Beam waist 110, as illustrated in FIG. 4, is formed at the position of the beam deflector of horizontal scanner 106.

FIGS. 5A, 5B, 5C and 5D are diagrams illustrating the configuration of beam diameter-converting optical system 104.

Figure 5A:
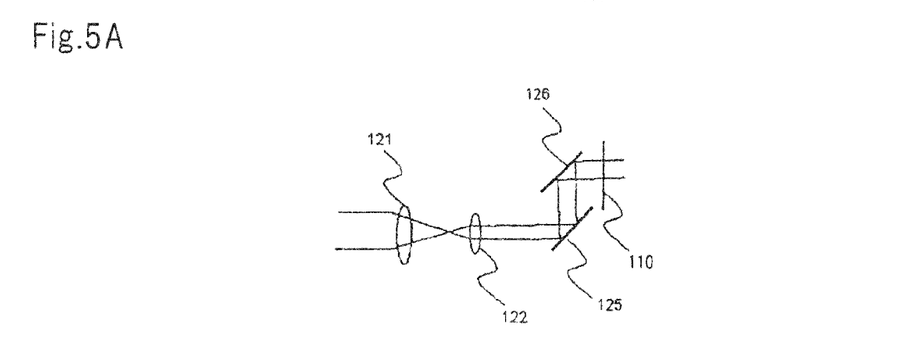
FIG. 5A is a diagram illustrating a configuration of a beam diameter-converting optical system including a combination of two convex lenses.

The beam diameter-converting optical system, as illustrated in FIG. 5A, includes an afocal system including a combination of convex lens 121 with a focal length of f1 and convex lens 122 with a focal length of f2. Here, when a collimated laser beam is made to enter the beam diameter-converting optical system, the beam diameter is converted at a magnification of f2/f1.

Figure 5B:
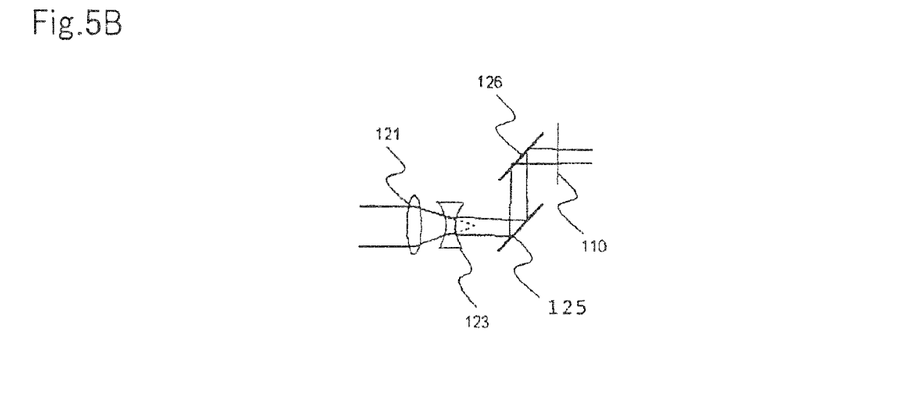
FIG. 5B is a diagram illustrating a configuration of a beam diameter-converting optical system including a combination of a convex lens and a concave lens.
Figure 5C:
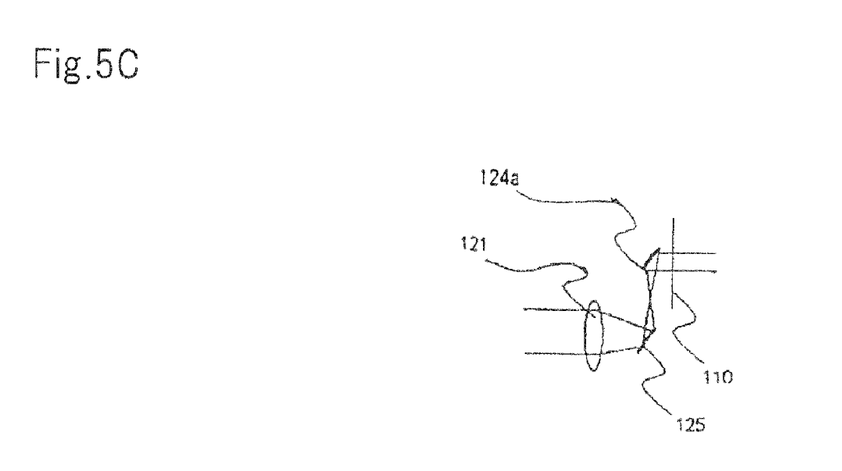
FIG. 5C is a diagram illustrating a configuration of a beam diameter converting optical system including a combination of vertical scanner formed of a concave mirror, and convex lens 121.
Figure 5D:
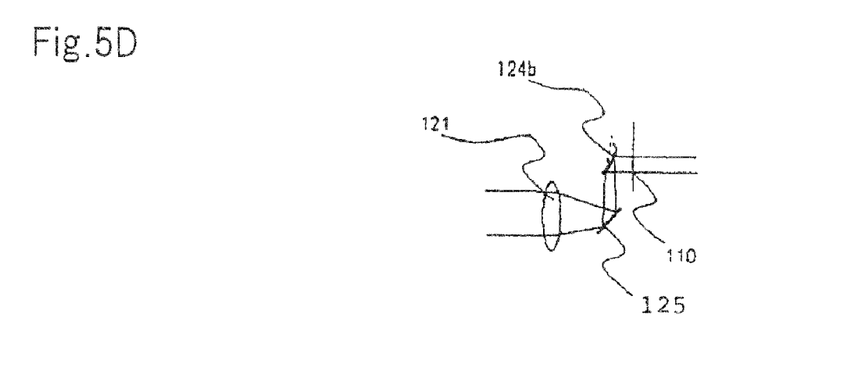
FIG. 5D is a diagram illustrating a configuration of a beam diameter-converting optical system including a combination of vertical scanner formed of a convex mirror, and convex lens 121.

Also, the beam diameter-converting optical system, as illustrated in FIG. 5B, may have a configuration including convex lens 121 that has a focal length of f1 and concave lens 123 that has a focal length of f2. Also the beam diameter-converting optical system, as illustrated in FIG. 5C, may have a configuration including a combination of concave mirror (vertical scanning element) 124a that has a focal length of f2, which is used as the vertical scanner, and convex lens 121 that has a focal length of f1. Also, the beam diameter-converting optical system, as illustrated in FIG. 5D, may have a configuration including a combination of convex mirror (vertical scanning element) 124b that has a focal length f2, which is used as the vertical scanner and convex lens 121 that has a focal length of f1. In the configurations illustrated in FIGS. 5C and 5D, a laser beam is collected by convex lens 121. Accordingly, these configurations can further downsize horizontal scanner 125, enabling high-speed operation and thus enabling high-definition image display. Concave mirror 124a and convex mirror 124b may also be used for the horizontal scanning element.

Here, the relationship between the propagation distance of a fundamental Gaussian beam and a beam diameter will be described with reference to FIGS. 6A and 6B.

Figure 6A:
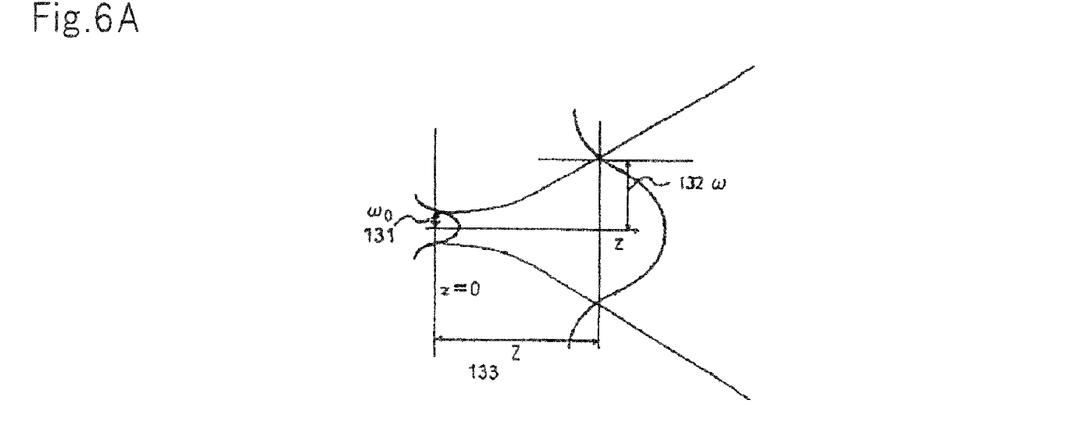
FIG. 6A is a diagram for describing the relationship between a propagation range of a fundamental Gaussian beam and a beam diameter.
Figure 6B:
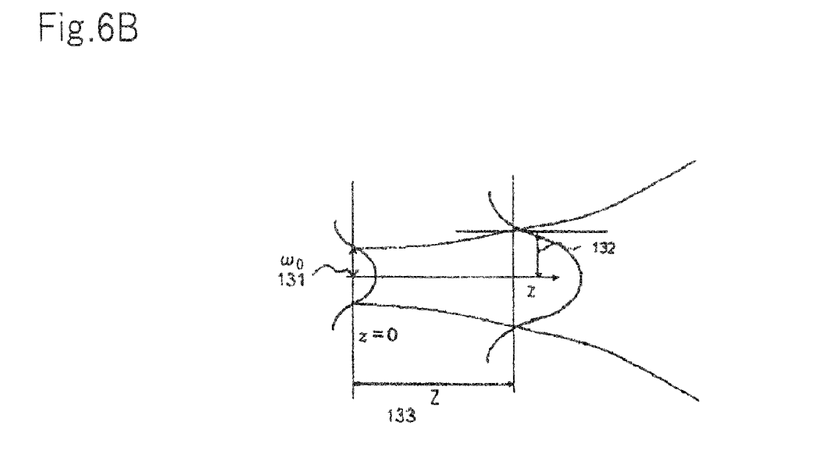
FIG. 6B is a diagram for describing the relationship between a propagation range of a fundamental Gaussian beam and a beam diameter.

The beam diameter of a fundamental Gaussian laser beam, as illustrated in FIG. 6A, which is calculated according to the Fresnel diffraction integral, becomes wider according to the propagation distance. Here, where the propagation distance of the laser is z, the beam waist position is z=0 and the beam waist radius (distance at which the amplitude value is decreased to 1/e of the maximum value) is $\omega_0$ (reference numeral 131), the relationships in formulae 1 and 2, which are indicated below, can be determined between propagation distance z (reference numeral 133) and beam radium $\omega$ (reference numeral 132). Here, $\lambda$ is the wavelength of laser light and $\pi$ is the circumference ratio. Furthermore, where the distance at which the intensity (the square of the amplitude) is decreased to ½ of the maximum value, i.e., the full width at half maximum of the beam intensity is D, formula 3 can be provided from the square distribution of a Gaussian function.

$$\omega^2 = \omega_0^2 \cdot \{1 + (z/a)^2\} \tag{1}$$

$$a = \pi \cdot \omega_0^2 / \lambda \tag{2}$$

$$D = \omega \cdot (-2 \cdot \ln(0.5))^{0.5} \tag{3}$$

Based on formulae 1 to 3 above, beam radius $\omega$ (full width at half maximum of the beam intensity D) varies according to propagation distance z. Also, as illustrated in FIG. 6A, beam radius $\omega$ (full width at half maximum of the beam intensity D) becomes wider as propagation distance z increases when the beam waist has a small radius. Meanwhile, as illustrated in FIG. 6B, beam radius $\omega$ (full width at half maximum of beam intensity D) does not become much wider even if propagation distance z increases when the beam waist has a large radius.

In other words, if the beam waist is made to be excessively smaller than the mirror size in order to ensure margin on the mirror, beam radius $\omega$ (the full width at half maximum of the beam intensity D) becomes wider as propagation distance z increases. As a result, the beam extends beyond the pixel pitch and overlaps an adjacent beam, making it impossible to provide a clear image.

Meanwhile, the beam waist is made to be excessively large to prevent the beam diameter from being overly widened even when propagation distance z increases, a margin on the mirror cannot be ensured, and thus, the point at which the beam diameter is no larger than the mirror size becomes the limit. As a result, a desired high-definition image cannot be provided.

In the present invention, based on such fundamental Gaussian beam properties, the beam diameter (full width at half maximum of the beam intensity D at z=0) on the mirror surface was determined so that full width at half maximum of the beam intensity D is equal to or smaller than a desired pixel pitch, i.e., a value obtained by dividing the horizontal screen size by the horizontal pixel count or a value obtained by dividing the vertical screen size by the vertical pixel count at propagation distance z.

Figure 7:
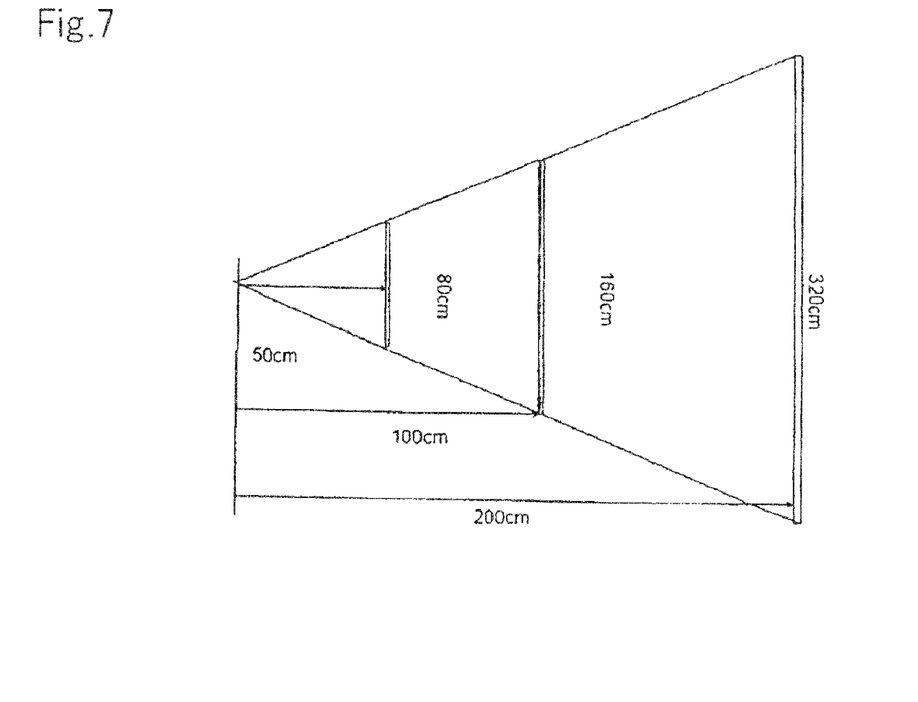
FIG. 7 is a diagram for indicating angles of view in a first exemplary embodiment.

FIG. 7 is a diagram for illustrating angles of field in the present exemplary embodiment.

As illustrated in FIG. 7, for a field angle in the present exemplary embodiment, it is determined that the horizontal screen size is 80 cm and the vertical screen size is 60 cm at a projection distance of 50 cm. Also, the beam diameter (full width at half maximum of the beam intensity D at z=0) on the mirror surface was determined so that the full width at half maximum of the beam has a value equal to or lower than a value obtained by dividing the vertical screen size of 60 cm by the vertical pixel count at a projection distance of 50 cm or more.

Figure 8:
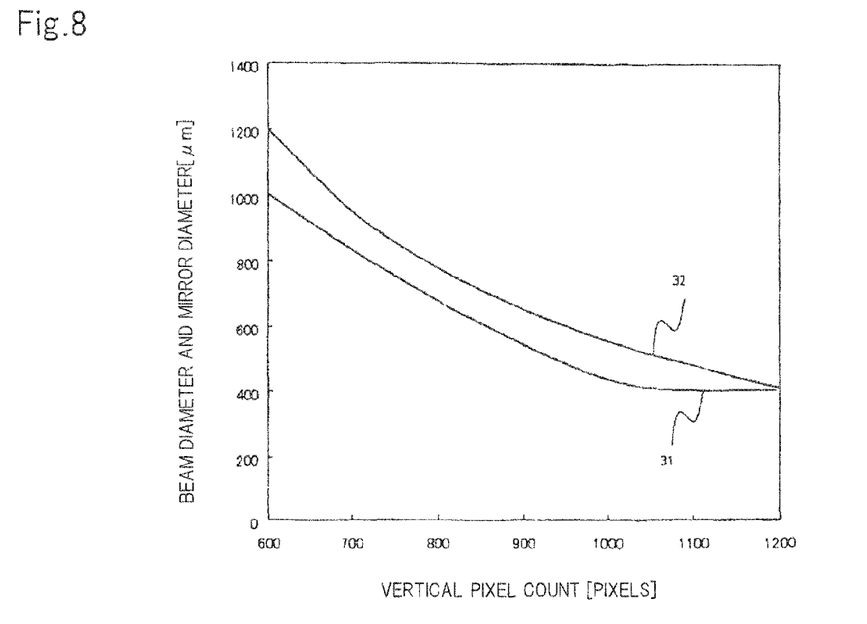
FIG. 8 is a diagram illustrating the relationship between a vertical pixel count, and a beam diameter on a mirror surface and a mirror diameter in a first exemplary embodiment.

FIG. 8 is a graph illustrating the relationship between the vertical pixel count and the beam diameter on the mirror surface and the mirror diameter in the present exemplary embodiment.

As illustrated in FIG. 8, in the case of the present exemplary embodiment, mirror diameter 32 can have a margin relative to beam diameter 31 on the mirror surface up to a vertical pixel count of around 1200 pixels. Accordingly, the present exemplary embodiment can solve the problem in which the beam diameter becomes smaller than the mirror diameter with a vertical pixel count of 800 pixels, as in the method related to the present invention, which is illustrated in FIG. 2.

FIGS. 9A-9D are diagrams illustrating the results of display in the case where a high-definition display is provided in the present exemplary embodiment.

An image definition of 1280 horizontal pixels and 1024 vertical pixels is provided. Also, the screen size was determined so that: the horizontal size is 80 cm and the vertical size is 60 cm (FIG. 9B) at a projection distance of 50 cm; the horizontal size is 160 cm and the vertical size is 120 cm (FIG. 9C) at a projection distance of 100 cm; and the horizontal size is 320 cm and the vertical size is 240 cm (FIG. 9D) at a projection distance of 200 cm. Here, as illustrated in FIG. 9A, a beam diameter-converting optical system that produces a beam whose beam diameter 31 (full width at half maximum of the beam intensity) at the beam waist position (mirror surface) is 412 μm for red (wavelength: 650 nm) was used.

Red laser source 101 is a collimated beam whose beam diameter, which is the full width at half maximum of the beam intensity, is 500 μm, and an incoming-side convex lens having a focal length of 5 mm and an outgoing-side convex lens having a focal length of 4.12 mm were used for the beam diameter-converting optical system (FIG. 5A).

The beam diameter-converting optical systems for green laser source 102 and blue laser source 103, as in the case of red laser source 101, were configured so as to provide the full width at half maximum of the beam intensity, which is calculated from the result obtained according to formulae 1 to 3.

A semiconductor laser for light of 650 nm was used for red laser source 101. A semiconductor laser-pumped solid-state laser, which emits light of 532 nm, which is the second harmonic wave of 1064 nm infrared light obtained by Nd:YAG crystal being pumped by an infrared semiconductor laser, was used for green laser source 102. A semiconductor laser for light of 440 nm was used for blue laser source 103. Also, in red laser source 101 and blue laser source 103, a collimator lens is provided next to be the light-outgoing end of the semiconductor laser to generate a collimated beam having a beam diameter of 500 μm.

For horizontal scanning, a resonance-type micromechanical scanning element was used for reciprocating scanning, and was driven with a swing angle of ±19.3 degrees and a frequency of 31 KHz. For vertical scanning, a galvanometer mirror was used, and was driven so as to produce sawtooth waves of 60 Hz.

For the size of the resonance-type micromechanical scanning element, a rounded mirror 26 whose mirror diameter 32 is 540 μm was used so that it could tolerate driving at 31 KHz. For the diameter of the galvanometer mirror, a rounded mirror having a diameter of 1200 μm was used.

The lasers are configured to perform intensity modulation every 12.7 ns in synchronization with the scanning element and emit light with a brightness according to the pixel value.

Figure 9B:
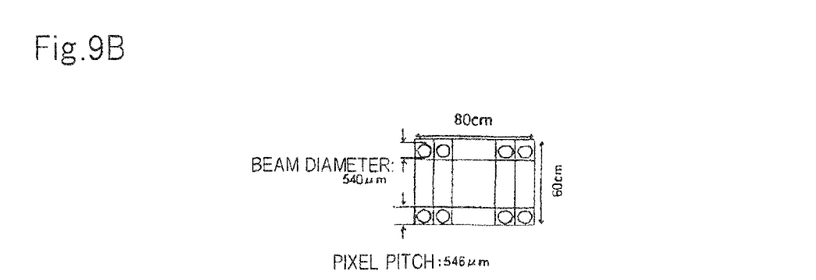
FIG. 9B is a schematic diagram illustrating the relationship between a pixel pitch and a full width at half maximum of a beam intensity at a predetermined projection distance.
Figure 9C:
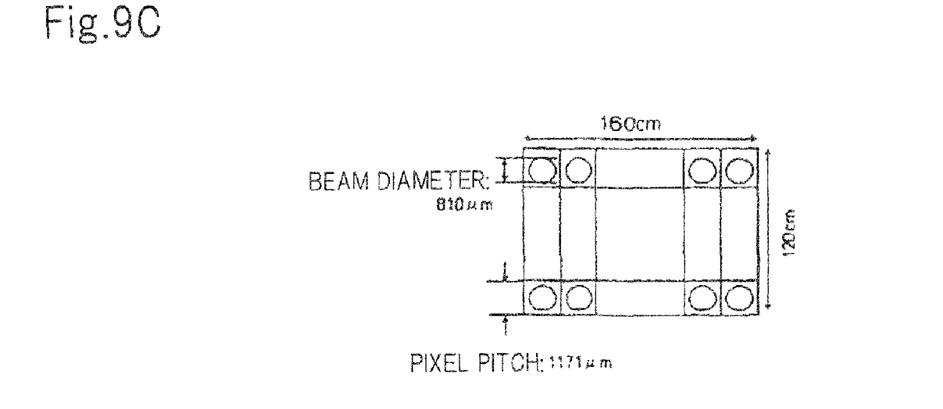
FIG. 9C is a schematic diagram illustrating the relationship between a pixel pitch and a full width at half maximum of a beam intensity at a predetermined projection distance when the projection distance is larger than that of the example in FIG. 9B.
Figure 9D:
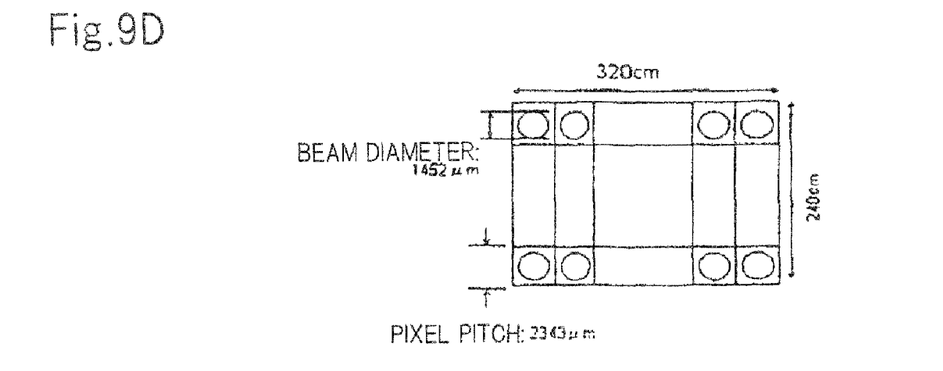
FIG. 9D is a schematic diagram illustrating a relationship between a pixel pitch and a full width at half maximum of a beam intensity at a predetermined projection distance when the projection distance is larger than that of the example in FIG. 9C.

When projecting a laser beam under these conditions, as illustrated in FIG. 9A, the full width at half maximum of the beam intensity was 540 μm at a projection distance of 50 cm, the full width at half maximum of the beam intensity was 810 μm at a projection distance of 100 cm, and the full width at half maximum of the beam intensity was 1452 μm at a projection distance of 200 cm. Meanwhile, as illustrated in FIGS. 9B, 9C and 9D, the full widths at half maximum of the laser beam intensity are 546 μm, 1171 μm and 2343 μm, which are pixel pitches according to the respective projection distances of 50 cm, 100 cm and 200 cm.

In other words, according to the present exemplary embodiment, the full width at half maximum of the beam intensity was made smaller than the pixel pitch at each projection distance. In other words, the full width at half maximum of the beam intensity, 540 μm, is smaller than the pixel pitch of 546 μm at a projection distance of 50 cm. Also, the full width at half maximum of the beam intensity, 810 μm, is smaller than the pixel pitch of 1171 μm at a projection distance of 100 cm. Furthermore, the full width at half maximum of the beam intensity, 1452 μm, is smaller than the pixel pitch of 2343 μm at a projection distance of 200 cm.

As described above, according to the present exemplary embodiment, a clear image with no overlap of pixels was always provided in a projection distance range of 50 to 200 cm.

Also, under these conditions, a mirror diameter of 540 μm, which is approximately 1.3 times the diameter of beam system 31 (full width at half maximum of the beam intensity) 412 μm, was ensured on mirror 26 of the resonance-type micromechanical scanning element. In other words, while in the technique related to present invention, 800 pixels are the limit of the vertical resolution in which the beam diameter is smaller than the mirror diameter, the present invention enables provision of a margin equivalent to a margin relative to the mirror opening limit for a vertical resolution of 600 pixels in the technique related to the present invention even in the case of a vertical resolution of 1024 pixels. Consequently, a clear image with less-disordered beam spots can be displayed.

When applying the beam diameter-converting optical system according to the present exemplary embodiment described above to a laser scanning-type image display device, a clear image with no overlap of elements was provided in a predetermined projection range without the user performing focusing while a margin relative to the beam diameter is ensured on the mirror, even though the mirror for providing higher definition for the scanning element has been downsized.

Second Exemplary Embodiment

FIGS. 10A to 10D illustrate states of display by an image display device according to the present exemplary embodiment. The present exemplary embodiment is an example of an application when projection is performed on an inclined plane screen using a curved screen or using the image display device according to first exemplary embodiment.

Figure 10A:
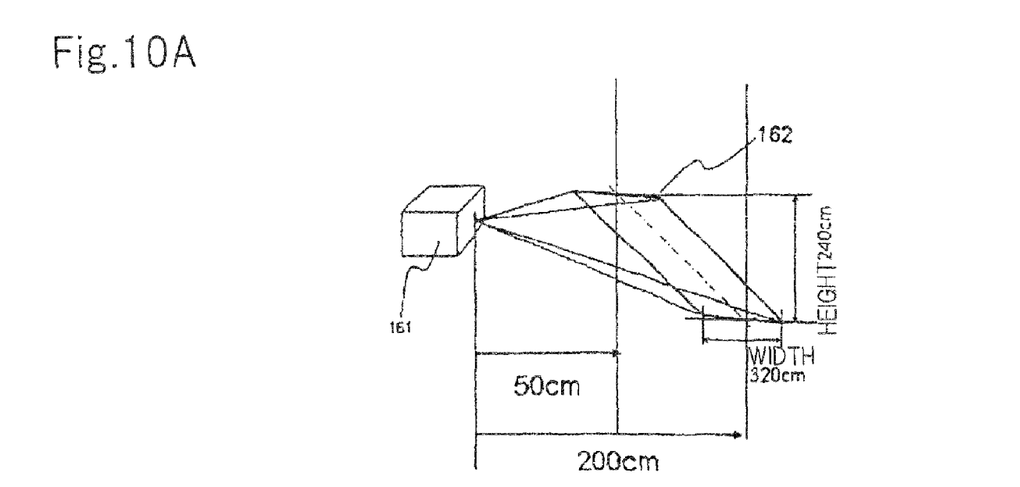
FIG. 10A is a diagram illustrating an example of the case where an image display device according to a second exemplary embodiment is employed for an inclined plane screen.
Figure 10B:
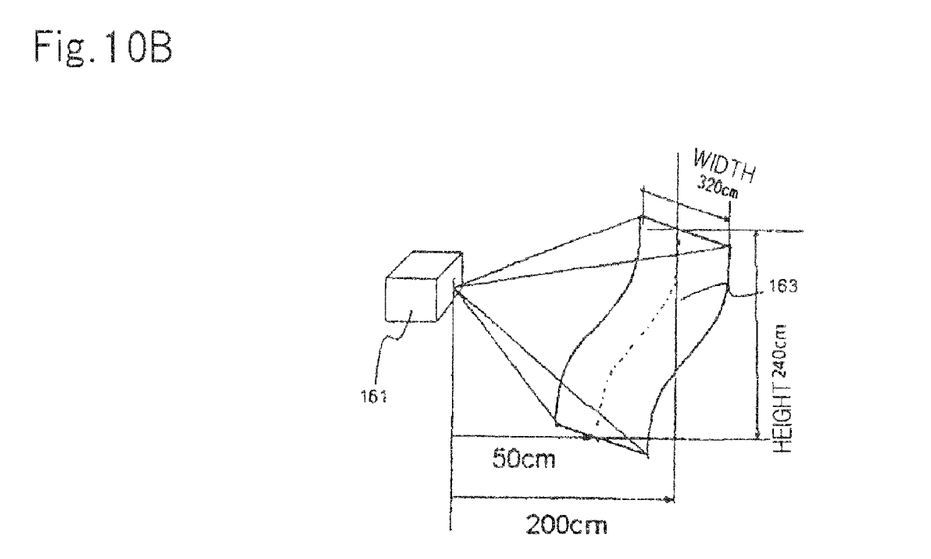
FIG. 10B is a diagram illustrating an example of the case where an image display device according to a second exemplary embodiment is employed for a curved screen.

In the present exemplary embodiment, projection was performed on inclined plane screen 162 illustrated in FIG. 10A and curved screen 163 illustrated in FIG. 10B.

In the present exemplary embodiment, the number of pixels in image display device 161 is 1280 for horizontal pixels and 1024 for vertical pixels. Also, the screen is 240 cm high and 320 cm wide and a projection distance range for the screen is 50 to 200 cm. Under these conditions, beam diameter-converting optical systems that generate a beam in which full width at half maximum of the beam intensity at the position of the beam waist is 412 μm for red (wavelength of 650 nm), as a condition for constantly providing a clear image, was used.

The laser scanning system has a configuration that is the same as the configuration of horizontal scanner 106 and vertical scanner 107 in the first exemplary embodiment, and the resonance-type micromechanical scanning element has a diameter of 540 μm, and a rounded mirror having a diameter of 1200 μm was used for the galvanometer mirror.

Figure 10C:
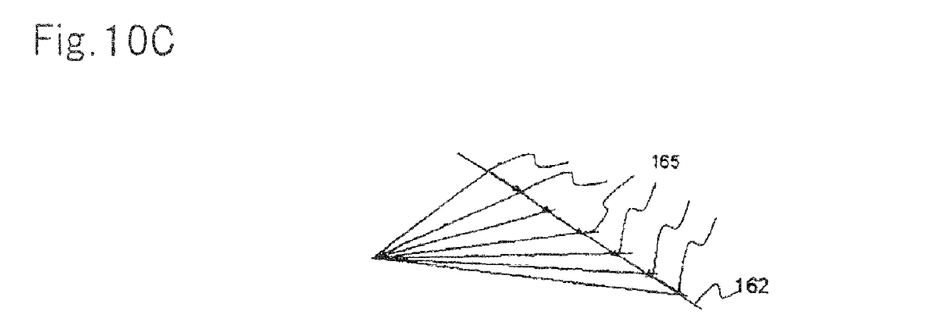
FIG. 10C is a diagram schematically illustrating pixel sample points on an inclined plane screen, which provide regular pixel intervals.
Figure 10D:
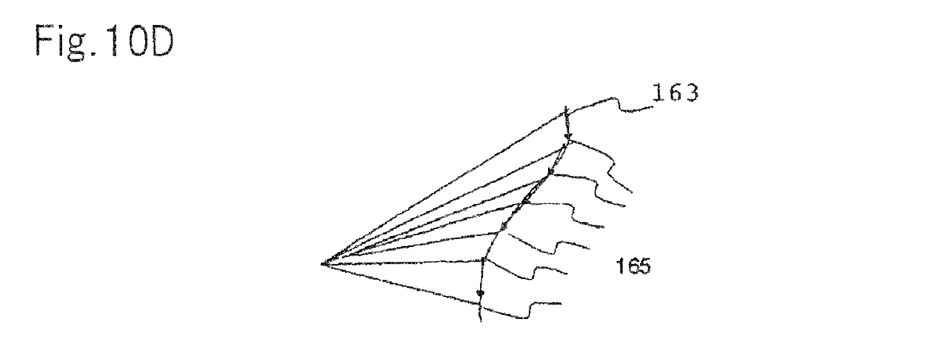
FIG. 10D is a diagram schematically illustrating pixel sample points in a curved screen, which provide regular pixel intervals.

Also, in the present image display device, it was assumed that the screen shape is a known one, and as illustrated in FIGS. 10C and 10D, the laser intensity was modulated at pixel sample points 165, which provide regular pixel intervals, for horizontal and vertical scanning.

Under these conditions, the full width at half maximum of the beam intensity at a projection distance of 50 cm was 540 μm, and the full width at half maximum of the beam intensity at a projection distance of 200 cm was 1452 μm. Both of the full widths at half maximum of the beam intensity at the respective distances are smaller than 540 μm and 2343 μm, which are the respective pixel pitches according to the projection distances. Accordingly, it has been confirmed that a clear image with no overlap of pixels can always be provided also on an inclined plane screen or on a curved screen in a projection distance range of 50 to 200 cm.

Also, under these conditions, a mirror diameter of 540 μm, which is approximately 1.3 times the full width at half maximum of the beam intensity, i.e., 412 μm, was ensured for the resonance-type micromechanical scanning element. In other words, while in the conventional technique, 800 pixels was the limit of the vertical resolution in which the beam diameter is smaller than the mirror diameter, the present invention enables provision of a margin relative to the mirror opening limit for a vertical resolution of 600 pixels in the conventional technique even in the case of a vertical resolution of 1024 pixels. Consequently, a clear image with less-disordered beam spots was displayed.

Although the present invention has been described above based on the exemplary embodiments, the present invention is not limited to the above-described exemplary embodiments.

The position of beam waist 110 formed by beam diameter-converting optical systems 104 may be a position advanced from the horizontal scanning element position toward the projection surface if the full width at half maximum of the beam intensity in the beam deflector (e.g., a mirror) of horizontal scanner 106 is larger than the beam deflector and if the full width at half maximum of the beam intensity at an employed projection distance range is smaller than the pixel pitch.

For the convex lens, the concave lenses, the convex mirrors and the concave mirrors in beam diameter-converting optical systems 104 in the present invention, diffraction elements providing similar optical actions, such as Fresnel zone plates or holograms, may be used.

In the present invention, although a dichroic mirror has been used as an example of the color-combining means, a dichroic prism or the like may be used as the color-combining means.

In the present invention, the light source includes means for controlling the current value of a laser for modulation, and means for performing modulation via a optical modulator. In other words, in the present invention, although modulation has been performed by controlling the current value of a laser for red and blue and by making laser light pass through an acoustooptic element for green, various types of optical modulator, such as a grating-type MEMS modulator, a waveguide-type modulator or an electrooptical crystal, may be used. Furthermore, laser intensity modulation may be performed by performing pulse-width modulation within time for scanning one pixel.

For horizontal scanning and vertical scanning, acoustooptic elements, electrooptical crystals or the like may be used, and an optical system that increases the swing angle by, e.g., a prism using a photonic crystal, may be provided.

The present invention can be applied to other pixel counts and screen sizes if such counts and sizes are the results obtained from formulae 1 to 3 and if the full width at half maximum of the beam intensity at an employed projection distance range is smaller than the pixel pitch. Also, the present invention can be applied to other projection distances, pixel counts and screen sizes if they are the results obtained from formulae 1 to 3.

Furthermore, the beam deflectors (e.g., mirrors) of the horizontal scanning and vertical scanning elements may have another size and shape if they are larger than the employed full width at half maximum of the intensity for the diameter of a beam passing through the beam deflectors.

Also, the laser light may have a number of wavelengths that are more than three wavelengths if they are within the visible light range.

The present application has been filed claiming priority based on Japanese Patent Application No. 2006-297605 filed on Nov. 1, 2006, the entire disclosure of which is incorporated herein by reference.

The invention claimed is:

1. An image display device comprising:
   scanner that scans a laser beam emitted from a light source to form an image on a projection surface; and
   a laser beam diameter-converting optical system that determines a position of a beam waist and a diameter of the beam waist so that a beam diameter of the laser beam at a position of a beam deflector of the scanner is smaller than a dimension of the beam deflector, and so that an intensity distribution of the laser beam according to a Fresnel diffraction integral is smaller than a pixel pitch.

2. The image display device according to claim 1, wherein the beam deflector is a resonance-type micromechanical mirror.

3. The image display device according to claim 1, wherein the position of the beam waist is located within a projection distance at which the projection surface exists.

4. The image display device according to claim 3, wherein the position of the beam waist is the same as the position of the beam deflector.

5. The image display device according to claim 1, wherein the scanner includes either a convex mirror or a concave mirror, and provides an afocal system.

6. The image display device according to claim 1, wherein the beam diameter of the laser beam is a full width at half maximum of its intensity.

7. The image display device according to claim 1, wherein the laser beam is a fundamental Gaussian beam.

8. The image display device according to claim 1, wherein the pixel pitch is a value obtained by dividing a horizontal size of a screen on the projection surface by a horizontal pixel count.

9. The image display device according to claim 1, wherein the pixel pitch is a value obtained by dividing a vertical size of a screen on the projection surface by a vertical pixel count.

10. The image display device according to claim 1, wherein the light source modulates a laser intensity according to a shape of the projection surface.

* * * * *